(12) United States Patent
Fan et al.

(10) Patent No.: US 9,113,370 B2
(45) Date of Patent: Aug. 18, 2015

(54) METHOD AND APPARATUS FOR HANDLING A STATIONARY USER TERMINAL IN A NETWORK

(75) Inventors: Jianke Fan, Espoo (FI); Jarkko T. Koskela, Oulu (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 143 days.

(21) Appl. No.: 13/882,878

(22) PCT Filed: Oct. 28, 2011

(86) PCT No.: PCT/FI2011/050947
§ 371 (c)(1),
(2), (4) Date: Aug. 16, 2013

(87) PCT Pub. No.: WO2012/059636
PCT Pub. Date: May 10, 2012

(65) Prior Publication Data
US 2013/0322360 A1 Dec. 5, 2013

Related U.S. Application Data

(60) Provisional application No. 61/408,874, filed on Nov. 1, 2010.

(51) Int. Cl.
*H04W 8/16* (2009.01)
*H04W 4/00* (2009.01)
*H04W 76/04* (2009.01)
*H04W 24/10* (2009.01)

(52) U.S. Cl.
CPC ............... *H04W 24/10* (2013.01); *H04W 8/16* (2013.01); *H04W 4/005* (2013.01); *H04W 76/04* (2013.01)

(58) Field of Classification Search
CPC ............................. H04W 24/10; H04W 4/005
USPC .......................................... 370/329; 455/436
See application file for complete search history.

(56) References Cited

U.S. PATENT DOCUMENTS

| 6,330,446 | B1 | 12/2001 | Mori | |
|---|---|---|---|---|
| 2007/0177682 | A1* | 8/2007 | Han et al. | 375/260 |
| 2007/0218889 | A1* | 9/2007 | Zhang et al. | 455/422.1 |
| 2008/0192766 | A1* | 8/2008 | Ranta-Aho et al. | 370/445 |
| 2009/0253470 | A1* | 10/2009 | Xu | 455/574 |
| 2010/0298001 | A1* | 11/2010 | Dimou et al. | 455/441 |
| 2011/0143660 | A1* | 6/2011 | Iwamura et al. | 455/39 |

FOREIGN PATENT DOCUMENTS

EP 1 843 482 A2 10/2007
WO WO 2008/115786 A1 9/2008

OTHER PUBLICATIONS

International Search Report for Application No. PCT/FI2011/050947 dated Jan. 18, 2012.

* cited by examiner

*Primary Examiner* — Alex Skripnikov
*Assistant Examiner* — Raza Ansari
(74) *Attorney, Agent, or Firm* — Alston & Bird LLP

(57) ABSTRACT

A method and apparatus are provided that may enable the facilitation of using a mobile terminal as a mobile gateway to integrate with a machine-to-machine (M2M) network. Communication with a user terminal that is stationary may therefore be optimized or simplified by providing mechanisms by which the user terminal may communicate its stationary status to the network. The network may then adjust communication configurations involving the user terminal based on the knowledge of the user terminal's status.

26 Claims, 9 Drawing Sheets

| Index | LCID values | |
|---|---|---|
| 0000 | CCCH | |
| 0001-01010 | Identity ID | |
| 01011-11001 | Reserved | |
| 11010 | Power Headorom report | |
| 11011 | C-RNTI | |
| 11100 | Truncated BSR | |
| 11101 | Short BSR | |
| 11110 | Long BSR | 1bit for "stationary" |
| 11111 | Padding | |

# METHOD AND APPARATUS FOR HANDLING A STATIONARY USER TERMINAL IN A NETWORK

TECHNOLOGICAL FIELD

Embodiments of the present invention relate generally to inter-device communications technology and, more particularly, relate to an apparatus and method for handling a stationary user terminal in a network.

BACKGROUND

The modern communications era has brought about a tremendous expansion of wired and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Machine-to-machine (M2M) communication has recently become an area of interest for its growth potential. M2M communication is also exciting to many users and developers for its potential for connecting devices for many different purposes such as smart homes, smart metering, fleet management, remote healthcare, access network operation management and numerous other uses.

M2M communication typically involves the connection of a device or group of devices to a remote server or computer system to enable remote measurement or remote reporting of information by the devices. In some cases, M2M communication involves the use of one or more sensors or other nodes or devices to gather information that can be passed to a network or computing device via some form of gateway device. Recently, user terminals such as mobile communication devices like cellular phones have been employed as the gateway device in order to enable remote devices or sensors to provide information to a central location or a network for processing. In some cases, the network may be the Internet or some more localized computing or communication network.

The use of cellular communication systems in M2M applications has been advantageous due to the wide coverage areas that are currently provided by cellular communication systems. Typical endpoint devices in an M2M communication system may be relatively small battery operated devices with relatively low transmission power capabilities. Thus, by interfacing with nearby mobile terminals that can connect to a cellular communication system, the endpoint devices can operate at low powers and still provide information to remote computing or storage devices via a mobile terminal acting as a gateway to, for example, a cellular network access point. While the connection between the gateway and the access point in such situations may be provided by cellular network resources, the connection between the gateway and the endpoint device may be some other short range communication radio (e.g., short range radios employing Bluetooth, wireless local area network (WLAN) and/or the like). However, management of power and/or other communication resources while employing a gateway in an integrated M2M to cellular network may be challenging. Thus, a M2M to cellular network is one example of a network in which resource management may be desirable.

BRIEF SUMMARY OF SOME EXAMPLE EMBODIMENTS

A method and apparatus are therefore provided that may enable the facilitation of using a mobile terminal as a mobile gateway to integrate with a M2M network. Some example embodiments of the present invention may enable optimization (or simplification) of communication with a user terminal that is stationary by providing mechanisms by which the user terminal may communicate its stationary status to the network. The network can then adjust communication configurations involving the user terminal based on the knowledge of the user terminal's status.

BRIEF DESCRIPTION OF THE SEVERAL VIEWS OF THE DRAWINGS

Figure 1:
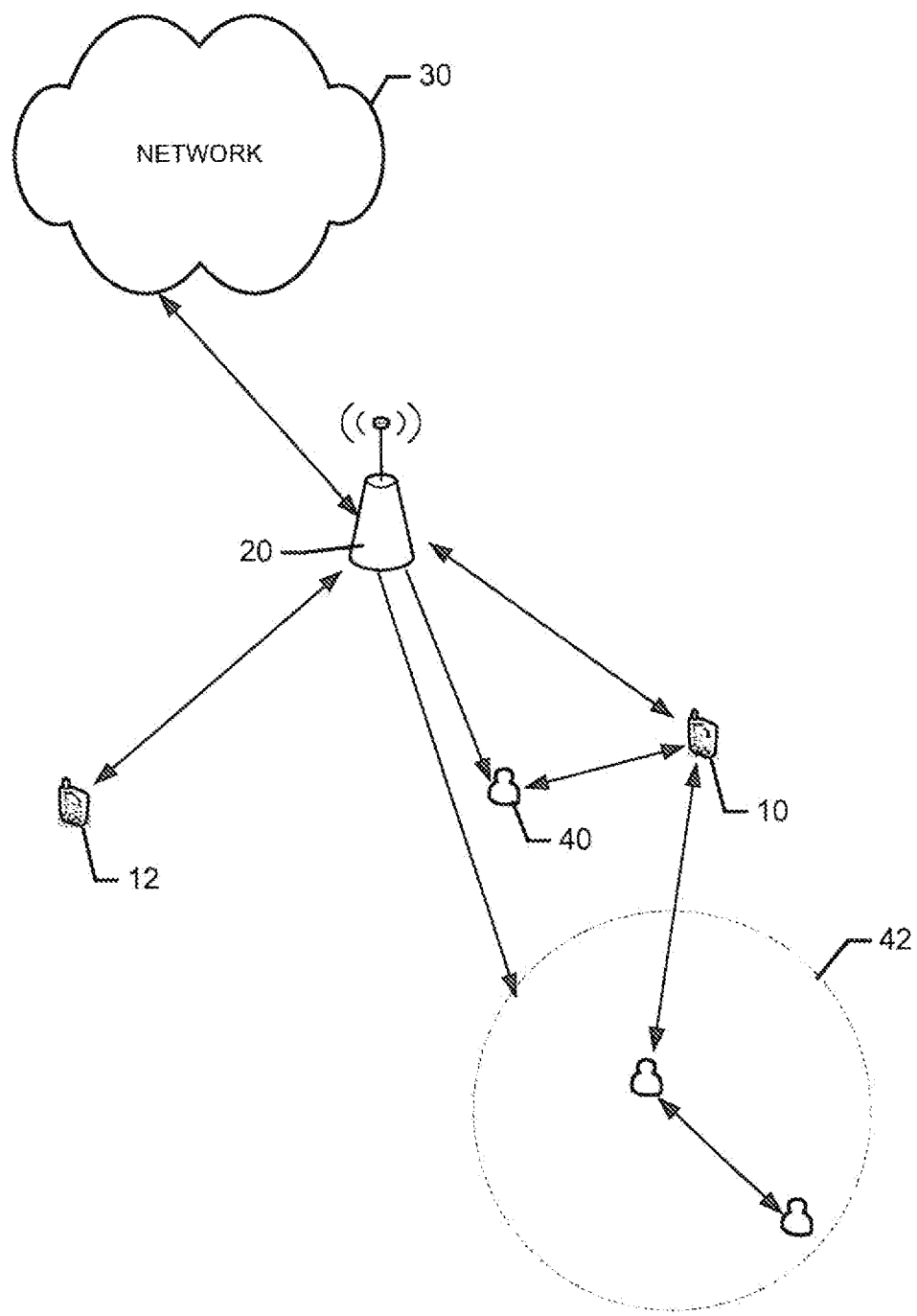
Figure 2:
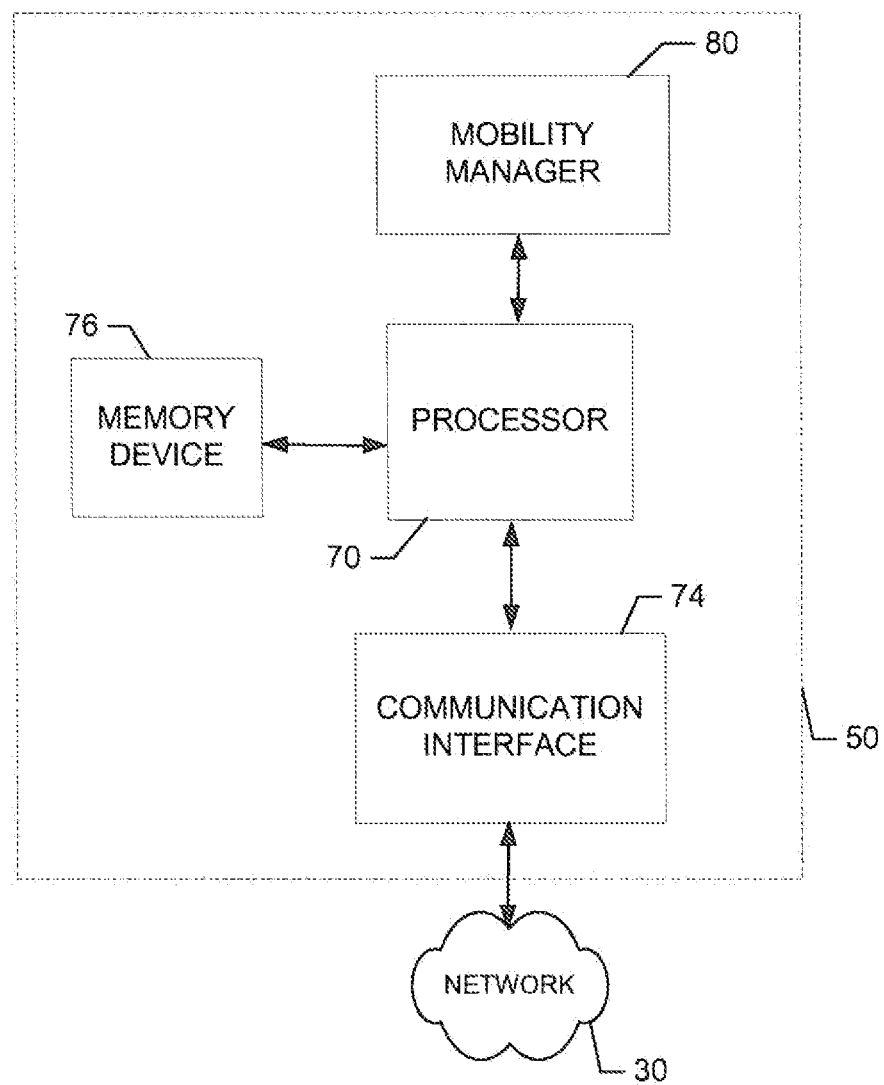
Figure 3:
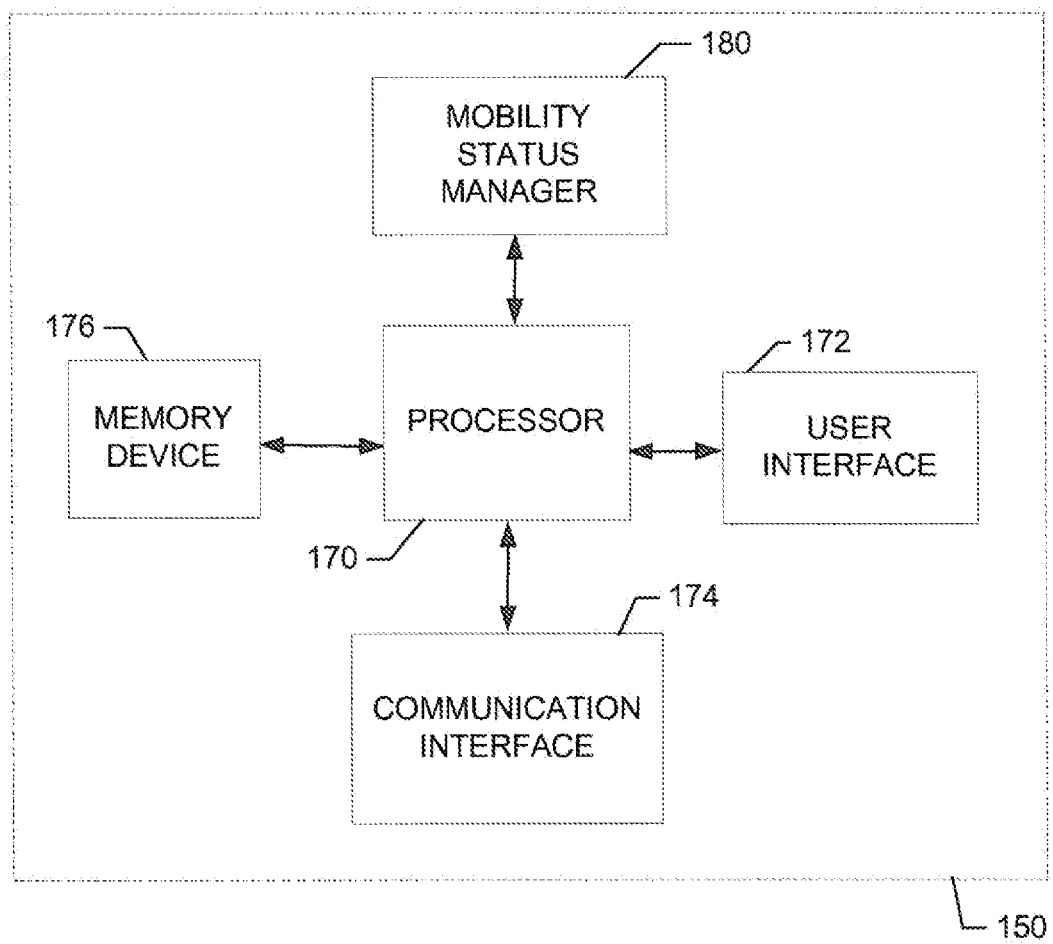
Figure 4:
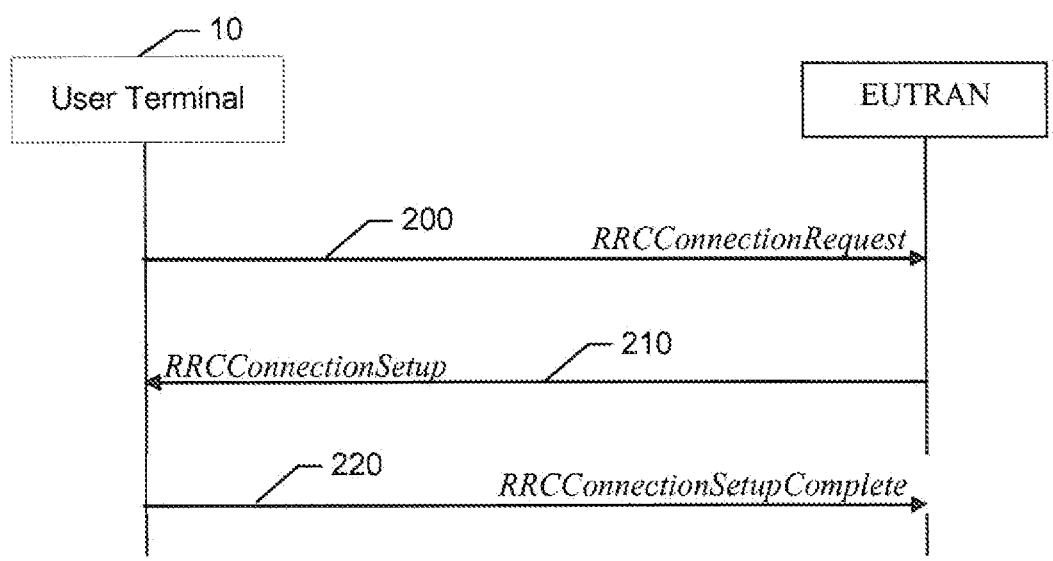
Figure 5:
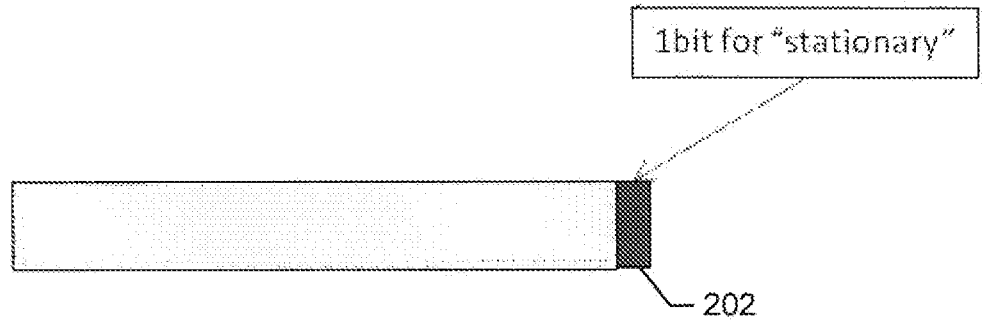
Figure 6:
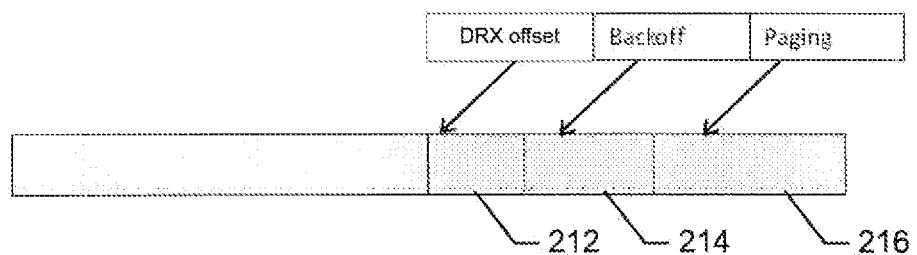
Figure 8:
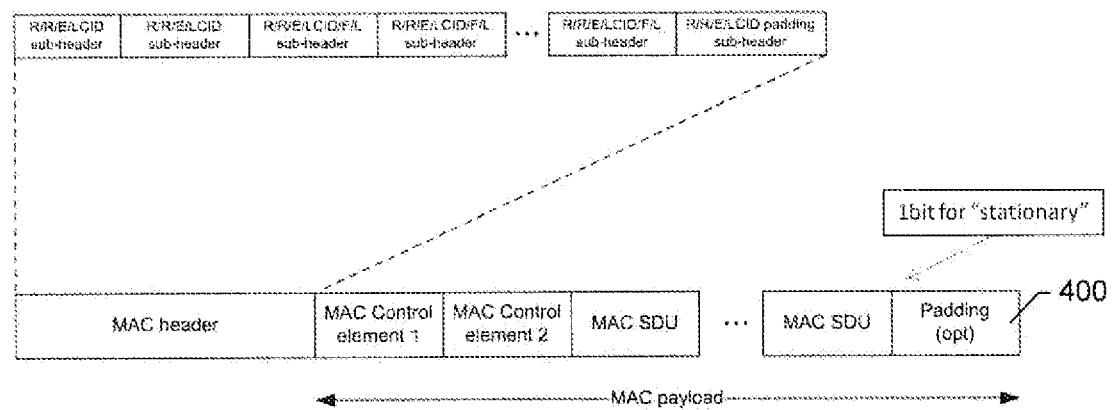
Figure 9:
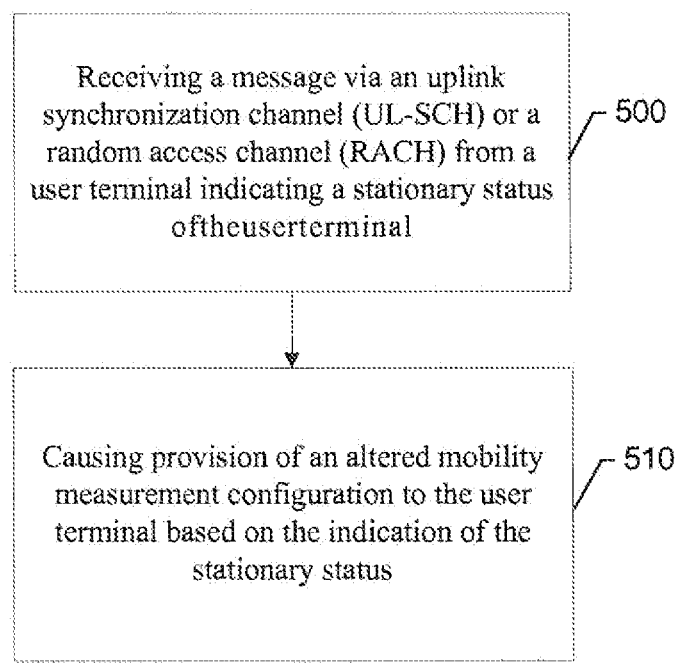
Figure 10:
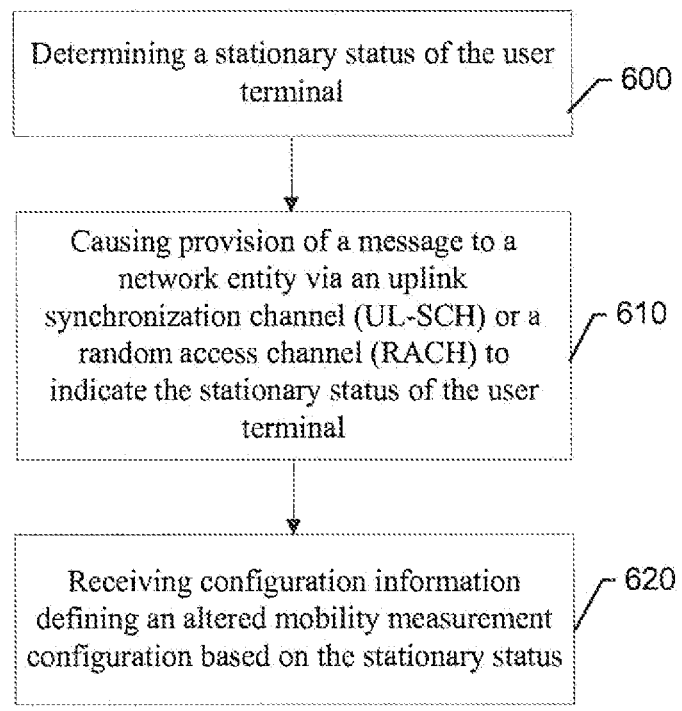

Having thus described some example embodiments of the invention in general terms, reference will now be made to the accompanying drawings, which are not necessarily drawn to scale, and wherein:

FIG. 1 illustrates one example of a communication system according to an example embodiment of the present invention;

FIG. 2 illustrates a block diagram of an apparatus that may be employed at a network element for managing handling of a stationary user terminal in accordance with an example embodiment of the present invention;

FIG. 3 illustrates a block diagram of an apparatus that may be employed at a user terminal for managing handling of a stationary user terminal in accordance with an example embodiment of the present invention;

FIG. 4 illustrates an RRC connection establishment procedure according to an example embodiment of the present invention;

FIG. 5 illustrates example RRC message structure for an RRCConnectionRequest message according to an example embodiment of the present invention;

FIG. 6 illustrates an example message structure for an RRCConnectionSetup message according to an example embodiment of the present invention;

FIG. 7 illustrates an example in which a logical channel ID structure may include a stationary status signal according to an example embodiment of the present invention;

FIG. 8 illustrates an example MAC PDU (media access control packet data unit) structure including a MAC header, MAC control elements, MAC SDUs (service data unit) and padding according to an example embodiment of the present invention;

FIG. 9 illustrates an example flowchart of a method of managing handling of a stationary user terminal operation in accordance with an example embodiment of the present invention; and FIG. 10 illustrates an example flowchart of another method of managing handling of a stationary user terminal in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, mobile terminals such as cellular phones may act as gateway devices to integrate in a M2M communication system into a larger network. The M2M communication system may include one or more sensors or other low power communication devices (e.g., machines) that cannot, in some examples due to transmission power limitations, but in some other examples perhaps also due to using different radios, communicate directly with a base station or access point of the larger network. Thus, the mobile terminal may relay communications from the machines to the base station or access point thereby acting as a gateway for the M2M communication system into the larger network. In some cases, the mobile terminal (or mobile gateway when acting as the gateway) may employ two different radios to perform the relaying function, particularly when employed with M2M communication systems involving relatively low power (e.g., low transmission power) sensors or sensor networks. Mobile terminals that can act as a mobile gateway may be said to have the capability to engage in machine type communication (MTC).

Because some user terminals (or user equipments (UEs)) are mobile, various configuration requirements are often in place to ensure that communication can be accomplished even when the user terminal moves between different coverage areas. However, in some situations, a gateway device may either not be mobile or may be stationary for a relatively long period of time. In such situations, the typical consideration that is given to mobility measurements or other factors that are typically considered due to the potential mobility of user terminals may not be necessary. Thus, for example, while during the initial phases of establishing a radio resource control (RRC) connection, the user terminal may be configured by the network to perform mobility measurement reporting, some example embodiments of the present invention may enable simplification of communications between the user terminal and the network (e.g., by avoiding configuration of the user terminal to provide mobility measurement reports).

Accordingly, some example embodiments may provide for a simplification or optimization of the MTC UE traffic pattern or UE functionality so as to achieve a simpler RRC protocol and simpler signaling and/or resource utilization in a network. Although example embodiments may be applied in any type of network, one embodiment that will be described herein as an example includes a mixture of a long term evolution (LTE)-MTC network.

Many devices (e.g., user equipments (UEs) or other user terminals, base stations or other access points such as node Bs (NBs) or evolved node Bs (eNBs), etc.) may include multiple radios or may otherwise have configurable antennas to permit operation over multiple frequencies. Some example embodiments may be useful in connection with device-to-device (D2D) and/or M2M communication, although embodiments may be useful in other environments as well. FIG. 1 illustrates a generic system diagram in which a device such as a user terminal 10 (or UE), is shown in an example communication environment in which embodiments of the present invention may be employed. As shown in FIG. 1, an embodiment of a system in accordance with an example embodiment of the present invention may include a first communication device (e.g., user terminal 10) and a second communication device 12 that may each be capable of communication with a network 30. The second communication device 12 is provided as an example to illustrate potential multiplicity with respect to instances of other devices that may be included in the network 30 and that may practice some example embodiments. The communications devices of the system may be able to communicate with network devices or with each other via the network 30. In some cases, the communication devices may be provided with access to the network via a base station, access point or other communication node (e.g., eNB 20). The eNB 20 may have a coverage area that defines a region within which communication devices may utilize the eNB 20 to access the network 30. In some cases, the eNB 20 may be a home eNB (HeNB).

The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the user terminal 10 and/or the second communication device 12 may be in communication with each other via the network 30 or via D2D communication. In some cases, each of the communication terminals may include an antenna or antennas for transmitting signals to and for receiving signals from a base site (e.g., eNB 20). The base site could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing circuitry (e.g., personal computers, server computers or the like) may be coupled to the user terminal 10 and/or the second communication device 12 via the network 30. In some embodiments, the network 30 may employ one or more mobile access mechanisms such as wideband code division multiple access (WCDMA), CDMA2000, global system for mobile communications (GSM), general packet radio service (GPRS), long term evolution (LTE), LTE advanced (LTE-A) and/or the like.

In some example embodiments, the user terminal 10 (and/or the second communication device 12) may be a mobile communication device such as, for example, a personal digital assistant (PDA), wireless telephone, mobile computing device, camera, video recorder, audio/video player, positioning device (e.g., a global positioning system (GPS) device), game device, television device, radio device, or various other like devices or combinations thereof. As such, the user terminal 10 may include one or more processors and one or more memories for storing instructions, which when executed by the processor, cause the user terminal 10 to operate in a particular way or execute specific functionality. The user terminal 10 may also include communication circuitry and corresponding hardware/software to enable communication with other devices.

In some embodiments, one or more of the communication devices (e.g., the user terminal 10 or the second communication device 12) may act as a relay or gateway device for other communication devices or machines such as sensors to communicate with the network 30 and/or other devices. FIG. 1 illustrates an example of a sensor (e.g., machine 40) that may communicate with the eNB 20 via the user terminal 10 acting as a gateway device. In some cases, the user terminal 10 may act as a gateway for a group of sensors or machines (e.g., machine group 42). In some cases, the sensors of the machine group 42 may be able to communicate with each other and one or more of the sensors may then communicate with the user terminal 10 acting as a gateway for access to the network 30. The machine 40 and/or the machine group 42 may be enabled to receive communications over an air interface from either or both of the user terminal 10 and the eNB 20. However, in some cases, power limitations or other restrictions may prevent the machine 40 and/or the machine group 42 from directly communicating with the eNB 20, which is why they may employ the user terminal 10 as a gateway for access to the network 30 via the eNB 20. Although example embodiments will be described hereinafter that may include either one or multiple machines, it should be appreciated that the use of one or multiple machines in connection with the gateway device is interchangeable.

In an example embodiment, each of the sensors or machines, the user terminal 10 and the network 30 or eNB 20 may include processing devices (e.g., a processor) and memory devices for storing instructions that when executed by the processor cause a corresponding functionality to be performed. These processing devices may embody or otherwise control, in some cases, modules and/or components configured for performing certain functions associated with example embodiments of the present invention. FIGS. 2 and 3 illustrate some examples of components that may be employed in connection with some example embodiments.

FIG. 2 illustrates a block diagram of an apparatus 50 that may be employed at a network element (e.g., the eNB 20) for managing connections with M2M devices or systems. The apparatus 50 may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a network device (e.g., eNB 20) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in hardware in a number of different ways. For example, the processor 70 may be embodied as one or more of various processing means such as a coprocessor, a microprocessor, a controller, a digital signal processor (DSP), a processing element with or without an accompanying DSP, or various other examples of processing circuitry including integrated circuits such as, for example, an ASIC (application specific integrated circuit), an FPGA (field programmable gate array), a microcontroller unit (MCU), a hardware accelerator, a special-purpose computer chip, or other similar hardware embodiments. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an eNB, HeNB, AP or other network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network 30. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control a mobility manager 80. As such, in some embodiments, the processor 70 may be said to cause, direct or control the execution or occurrence of the various functions attributed to the mobility manager 80 as described herein. The mobility manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the connection manager 80 as described herein. Thus, in examples in which software is employed, a device or circuitry (e.g., the processor 70 in one example) executing the software forms the structure associated with such means.

The mobility manager 80 may be configured to provide configuration instructions to one or more user terminals based on the mobility status of the respective terminals as indicated by reports that the respective terminals send to the mobility manager 80. In an example embodiment, the mobility manager 80 may be configured to receive messages from user terminals and determine whether a stationary status signal is received from any of the user terminals. The stationary status signal may indicate to the mobility manager 80 that the corresponding user terminal that sent the stationary status signal has a stationary status. A stationary status may indicate that the corresponding user terminal is not currently mobile. In some cases, a user terminal (e.g., user terminal 10) sending the stationary status signal may be fixed (temporarily or permanently) in a particular location to act as a gateway for one or more machines. However, in other situations, the user terminal may simply be stationary for a certain period of time before the user terminal 10 returns to being (or becomes) mobile. Regardless of the particular situation that causes the user terminal 10 to provide the stationary status signal to the mobility manager 80, the mobility manager 80 may alter the mobility measurement configuration of the user terminal 10 in response to receipt of the stationary status signal. In some embodiments, the user may provide input to indicate that the user terminal 10 will be stationary for a given period of time. However, in other cases, the mobility manager 80 may be enabled to determine its mobility status based on schedule information, past history, current conditions and/or device settings.

In an example embodiment, responsive to receipt to the stationary status signal, the mobility manager 80 may configure the user terminal 10 to employ simpler configuration of RRC connection reconfiguration procedures. As an example, the mobility manager 80 may configure the user terminal 10 to not provide mobility measurements, since the user terminal 10 is not mobile at that time, and therefore reports on mobility measurements would unnecessarily consume network resources. In some cases, rather than avoiding all mobility measurements, such measurements may be reduced (or minimized) to save device processing resources and power consumption. Alternatively or additionally, new or different measurement performance requirements could be defined for the user terminal to, for example, relax communication requirements for non-moving user terminals. In some embodiments, some parameters can be fixed for RRC connection reconfiguration. For example, some parameter could be added to the RRC connection setup procedure in association with the stationary status signal indication such as, for example, an offset for discontinuous reception (DRX) and/or a back-off parameter or paging parameter to be signaled in an RRC setup message from the mobility manager 80 to the user terminal 10 for better system overload control. In some embodiments, various different mechanisms may be employed by the user terminal 10 to inform the mobility manager 80 of the mobility status of the user terminal 10.

In some embodiments, the user terminal 10 may include an apparatus 150 for facilitating managing connections with the eNB 20 based on mobility of the user terminal 10 as shown in FIG. 3. The apparatus 150 may be employed in connection with a communication device (e.g., user terminal 10 and/or the second communication device 12) practicing an example embodiment of the present invention. The apparatus 150 may include or otherwise be in communication with a processor 170, a user interface 172, a communication interface 174 and a memory device 176. The processor 170, the communication interface 174, and the memory device 176 may each be similar in general function and form to the processor 70, the communication interface 74 and the memory device 76 described above (except perhaps with semantic and scale differences), so a detailed explanation of these components will not be provided.

The apparatus 150 may, in some embodiments, be a user terminal (e.g., user terminal 10) or a fixed communication device or computing device configured to employ an example embodiment of the present invention. However, in some embodiments, the apparatus 150 may be embodied as a chip or chip set. In other words, the apparatus 150 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 150 may therefore, in some cases, be configured to implement an embodiment of the present invention on a single chip or as a single "system on a chip." As such, in some cases, a chip or chipset may constitute means for performing one or more operations for providing the functionalities described herein.

The user interface 172 may be in communication with the processor 170 to receive an indication of a user input at the user interface 172 and/or to provide an audible, visual, mechanical or other output to the user. As such, the user interface 172 may include, for example, a keyboard, a mouse, a joystick, a display, a touch screen, soft keys, a microphone, a speaker, or other input/output mechanisms. In this regard, for example, the processor 170 may comprise user interface circuitry configured to control at least some functions of one or more elements of the user interface, such as, for example, a speaker, ringer, microphone, display, and/or the like. The processor 170 and/or user interface circuitry comprising the processor 170 may be configured to control one or more functions of one or more elements of the user interface through computer program instructions (e.g., software and/or firmware) stored on a memory accessible to the processor 170 (e.g., memory device 176, and/or the like).

In an example embodiment, the processor 170 may be embodied as, include or otherwise control a mobility status manager 180. The mobility status manager 180 may be any means such as a device or circuitry operating in accordance with software or otherwise embodied in hardware or a combination of hardware and software (e.g., processor 170 operating under software control, the processor 170 embodied as an ASIC or FPGA specifically configured to perform the operations described herein, or a combination thereof) thereby configuring the device or circuitry to perform the corresponding functions of the mobility status manager 180 as described herein. Thus, in examples in which software is employed, a device or circuitry (e.g., the processor 170 in one example) executing the software forms the structure associated with such means.

In an example embodiment, the mobility status manager 180 may be configured to indicate a stationary mobility status to the eNB 20 (e.g., to the mobility manager 80) by providing the stationary status signal to the mobility manager 80 when the user terminal 10 is stationary (or will be for some minimum length of time). In an example embodiment, the mobility status manager 180 may be configured to provide the stationary status signal to the mobility manager 80 in any of a number of ways. The mobility status manager 180 may provide the stationary status signal when the user terminal 10 is either immobile, or expects to be stationary for a predetermined period of time, during which mobility measurement requirements may be relaxed or omitted all together.

As indicated above, the stationary status signal may be provided via any of a plurality of different mechanisms. Thus, for example, the stationary status signal could be provided via any of various different channels. In some cases, a logical channel used in RRC messaging may be employed to provide the stationary status signal. Alternatively, an uplink synchronization channel (UL-SCH), a random access channel (RACH) or some other channel may be employed. The stationary status signal could also be provided via any of a plurality of different ways. For example, in some cases, the stationary status signal could simply take the form of an indication provided via a single bit (e.g., a stationary status bit) that could be set to indicate that the corresponding user terminal is stationary. After providing the stationary status signal, the mobility status manager 180 may wait to receive configuration instructions from the mobility manager and cause performance of measurement reporting in accordance with the configuration instructions received therefrom.

One mechanism by which the mobility status manager 180 may provide the stationary status signal may be via signaling as part of RRC messages. In some cases, the stationary status signal may be provided as capability information provided by a user terminal to the network. In this regard, for example, the signaling may be included in a UERadioAccessCapabilityInformation message using a nonCriticalExtension sequence. In some cases, the stationary status bit may be provided in a UE-EUTRA-Capability message so that, in addition to user terminal category signaling, there may also be an indication regarding user terminal stationary status. This could also be performed as an extension sequence to existing nonCriticalExtension sequences that are already optionally available to current user terminals.

In some examples, the stationary status signal may be provided as part of a RRCConnectionRequest message. For example, during RRC establishment procedures, the mobility status manager 180 may be configured to provide a stationary status bit when the user terminal 10 sends the RRCConnectionRequest message over the common control channel (CCCH). FIG. 4 illustrates an RRC connection establishment procedure according to an example embodiment. As shown in FIG. 4, the user terminal 10 may provide the RRCConnectionRequest message 200 to the network (e.g., EUTRAN via a network element such as the eNB 20) including the stationary status bit (or bits). The stationary status bit may be put into a current spare bit in the RRCConnectionRequest message 200. FIG. 5 illustrates an example RRC message structure for the RRCConnectionRequest message 200. As shown in FIG. 5, the message includes the same structure previously employed, but includes the stationary status bit 202 as well.

Responsive to the RRCConnectionRequest message 200, the network may provide an RRCConnectionSetup message 210. FIG. 6 illustrates an example message structure for the RRCConnectionSetup message 210. As shown in FIG. 6, the message may include the same structure previously employed, but may include an indication of DRX offset 212, backoff parameter 214 and/or paging parameter 216 to configure the user terminal 10 for measurement reporting while the user terminal 10 has the stationary status. Responsive to receipt of the RRCConnectionSetup message 210, the user terminal 10 may provide the network with a RRCConnectionSetupComplete message 220, as is also shown in FIG. 4. The provision of the DRX offset 212, backoff parameter 214 and/or paging parameter 21 may configure the system for better system overload control.

As an alternative to the use of signaling in RRC messages, the mobility status manager 80 may use signaling as part of a media access control (MAC) header for UL-SCH. In some examples, the logical channel identity (LCID) may identify the type of corresponding MAC control element or padding for the UL-SCH. FIG. 7 illustrates an example in which the UL-SCH LCID may include the stationary status signal. In particular, FIG. 7 illustrates how the stationary status signal may be provided as a stationary status bit (or bits) set in the padding bits of the LCID. In this regard, FIG. 7 illustrates an index of the LCID values for various portions of the UL-SCH LCID including the padding 300, which includes a stationary status bit 310.

In some other examples, the stationary status signal may be provided as a part of a RACH message. When M2M user terminals are switched on, a RACH procedure may be triggered by request of a preamble transmission from higher layers. After receiving a response message including a timing advance command, a user terminal that engages in MTC may request bandwidth and time resources in order to transmit data an indicate a user terminal specific identifier in another message (e.g., Msg 3). The message (e.g., a random access procedure (RAP) Msg 3 message) may include the stationary status signal. In some examples, the message may be transmitted on a UL-SCH containing a C-RNTI (cell radio network temporary identifier) MAC CE or CCCH SDU (service data unit). If the message is the first successfully received RAP message within a current random access procedure, the user terminal may obtain the MAC PDU to transmit from a multiplexing and assembly entity and store it in a Msg 3 buffer. FIG. 8 illustrates an example MAC PDU structure including a MAC header, MAC control elements, MAC SDUs and padding 400. The bits in the padding 400 may be optional in some cases. However, when employed, one or more of the bits of the padding 400 may be used for providing the stationary status signal.

Employing example embodiments of the present invention, a stationary user terminal may engage in a simpler configuration of the RRC connection reconfiguration procedure. Thus, for example, if the user terminal happens to be employed for interfacing with metering devices for reporting sensor data from the metering devices over a predefined period of time (e.g., one or more hours), and thus, the user terminal will be substantially stationary over the predefined period of time, the processing and battery consumption of the user terminal may be reduced by altering mobility related reporting performed by the user terminal. As an example, some features related to mobility reporting may not need to be implemented such as measurement gaps, SON (self optimizing networks) ANR (automatic neighbor relations) etc., or may be implemented with fixed parameters that are aimed at reducing processing resource and battery consumption.

In some embodiments, in order to prevent or mitigate congestion problems, clusters of pico-cells may be defined for stationary user terminal communication, where devices are communicating with a HeNB, or where the devices belong to a closed service group (CSG). The stationary user terminal communication clusters may then be prioritized lower to enable load control. However, example embodiments may also be employed in connection with embodiments where congestion problems are not deemed to be likely to occur.

FIGS. 9 and 10 are flowcharts of a system, method and program product according to some example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, one embodiment of a method for handling a stationary user terminal in a network from the perspective of a network device (e.g., eNB 20), as shown in FIG. 9, includes receiving a message via an uplink synchronization channel (UL-SCH) or a random access channel (RACH) from a user terminal indicating a stationary status of the user terminal at operation 500. The message may include a stationary status bit (or bits) disposed in a MAC header of the UL-SCH or a signaling bit in the padding of the RACH. The method may further include causing provision of an altered mobility measurement configuration to the user terminal based on the indication of the stationary status at operation 510.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In an example embodiment, receiving the message may include receiving the message responsive to a determination that the user terminal will be disposed at a location for a predetermined period of time. In some embodiments, causing provision of the altered mobility measurement configuration may include directing the user terminal to employ simpler configuration of RRC connection reconfiguration procedures such as not providing mobility measurements, providing such measurements according to relaxed requirements or providing parameters to the user terminal to define an offset for discontinuous reception (DRX) and/or a back-off parameter or a paging parameter.

Another embodiment of a method for handling a stationary user terminal from the perspective of a user terminal device (e.g., user terminal 10), as shown in FIG. 10, includes determining a stationary status of the user terminal (e.g., via positioning information provided by a positioning sensor of the user terminal) at operation 600. Causing provision of a message to a network entity via an uplink synchronization channel (UL-SCH) or a random access channel (RACH) to indicate the stationary status of the user terminal at operation 610. The message may include a stationary status bit disposed in a MAC header of the UL-SCH or a signaling bit (or bits) in the padding of the RACH. The method may further include receiving configuration information defining an altered mobility measurement configuration based on the stationary status at operation 620. An example embodiment may be practiced in connection with a network that includes a mixture of a long term evolution (LTE)-MTC network. The network may detect that the user terminals are MTC terminals by MTC indication (e.g. pre-configured method), and then the network may search for a stationary indication element in the location of padding bits that are used by current user terminals. The padding bits ambiguity can be avoided thereby.

In some embodiments, certain ones of the operations above may be modified or further amplified as described below. Moreover, in some embodiments additional optional operations may also be included. It should be appreciated that each of the modifications or amplifications below may be included with the operations above either alone or in combination with any others among the features described herein. In an example embodiment, the altered mobility measurement configuration may include information directing the user terminal to employ simpler configuration of RRC connection reconfiguration procedures such as not providing mobility measurements, providing such measurements according to relaxed requirements or providing parameters to define an offset for discontinuous reception (DRX) and/or a back-off parameter or a paging parameter.

In an example embodiment, an apparatus for performing the method of FIG. 9 above may comprise a processor (e.g., processor 70) configured to perform some or each of the operations (500-510) described above. The processor may, for example, be configured to perform the operations (500-510) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 500-510 may comprise, for example, the mobility manager 80. Additionally or alternatively, at least by virtue of the fact that the processor 70 may be configured to control or even be embodied as the mobility manager 80, the processor 70 and/or a device or circuitry for executing instructions or executing an algorithm for processing information as described above may also form example means for performing operations 500-510.

An example of an apparatus according to an example embodiment may include at least one processor and at least one memory including computer program code. The at least one memory and the computer program code may be configured to, with the at least one processor, cause the apparatus to perform the operations 500-510 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 500-510 (with or without the modifications and amplifications described above in any combination).

In an example embodiment, an apparatus for performing the method of FIG. 10 above may comprise a processor (e.g., the processor 170) configured to perform some or each of the operations (600-620) described above. The processor may, for example, be configured to perform the operations (600-620) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-620 may comprise, for example, the mobility status manager 180. Additionally or alternatively, at least by virtue of the fact that the processor 170 may be configured to control or even be embodied as the mobility status manager 180, the processor 170 and/or a device or circuitry for executing instructions or executing an algorithm for processing information as described above may also form example means for performing operations 600-620.

An example of an apparatus according to an example embodiment may include at least one processor and at least one memory including computer program code. The at least one memory and the computer program code may be configured to, with the at least one processor, cause the apparatus to perform the operations 600-620 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 600-620 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
receiving a message via an uplink synchronization channel (UL-SCH) from a user terminal indicating a stationary status of the user terminal, wherein the message includes at least one stationary status bit in a media access control (MAC) header of the UL-SCH; and
causing provision of an altered mobility measurement configuration to the user terminal based on the indication of the stationary status.

2. The method according to claim 1 wherein receiving the message comprises receiving the message responsive to a determination that the user terminal will be disposed at a location for a predetermined period of time.

3. The method according to claim 1, wherein causing provision of the altered mobility measurement configuration comprises directing the user terminal to employ a radio resource control (RRC) connection reconfiguration procedure.

4. The method according to claim 3 wherein directing the user terminal to employ an RRC connection reconfiguration procedure comprises directing the user terminal to employ an RRC connection reconfiguration procedure without provision of a mobility measurement.

5. The method according to claim 3 wherein directing the user terminal to employ an RRC connection reconfiguration procedure comprises directing the user terminal to provide mobility measurements according to requirements that are relaxed relative to requirements imposed upon the user terminal in a mobile state.

6. The method according to claim 3 wherein directing the user terminal to employ an RRC connection reconfiguration procedure comprises causing provision of at least one parameter to the user terminal to define at least one of an offset for discontinuous reception (DRX), a back-off parameter or a paging parameter.

7. An apparatus comprising at least one processor and at least one memory storing computer program code, wherein the at least one memory and stored computer program code are configured, with the at least one processor, to cause the apparatus to at least:
receive a message via an uplink synchronization channel (UL-SCH) from a user terminal indicating a stationary status of the user terminal, wherein the message includes at least one stationary status bit in a media access control (MAC) header of the UL-SCH; and
cause provision of an altered mobility measurement configuration to the user terminal based on the indication of the stationary status.

8. The apparatus according to claim 7 wherein the at least one memory and stored computer program code are configured, with the at least one processor, to cause the apparatus to receive the message by receiving the message responsive to a determination that the user terminal will be disposed at a location for a predetermined period of time.

9. The apparatus according to claim 7, wherein the at least one memory and stored computer program code are configured, with the at least one processor, to cause the apparatus to cause provision of the altered mobility measurement configuration by directing the user terminal to employ a radio resource control (RRC) connection reconfiguration procedure.

10. The apparatus according to claim 9 wherein the at least one memory and stored computer program code are configured, with the at least one processor, to cause the apparatus to direct the user terminal to employ an RRC connection reconfiguration procedure by directing the user terminal to employ an RRC connection reconfiguration procedure without provision of a mobility measurement.

11. The apparatus according to claim 9 wherein the at least one memory and stored computer program code are configured, with the at least one processor, to cause the apparatus to direct the user terminal to employ an RRC connection reconfiguration procedure by directing the user terminal to provide mobility measurements according to requirements that are relaxed relative to requirements imposed upon the user terminal in a mobile state.

12. The apparatus according to claim 9 wherein the at least one memory and stored computer program code are configured, with the at least one processor, to cause the apparatus to direct the user terminal to employ an RRC connection reconfiguration procedure by causing provision of at least one parameter to the user terminal to define at least one of an offset for discontinuous reception (DRX), a back-off parameter or a paging parameter.

13. A computer program product comprising at least one computer-readable storage medium having computer-executable program code portions stored therein, the computer-executable program code portions comprising program code instructions for:
receiving a message via an uplink synchronization channel (UL-SCH) from a user terminal indicating a stationary status of the user terminal, wherein the message includes at least one stationary status bit in a media access control (MAC) header of the UL-SCH; and
causing provision of an altered mobility measurement configuration to the user terminal based on the indication of the stationary status.

14. A method comprising:
determining a stationary status of a user terminal;
causing provision of a message to a network entity via an uplink synchronization channel (UL-SCH) to indicate the stationary status of the user terminal, wherein the message comprises at least one stationary status bit disposed in a media access control (MAC) header of the UL-SCH; and
receiving configuration information defining an altered mobility measurement configuration based on the stationary status.

15. The method according to claim 14 wherein determining the stationary status comprises determining the stationary status based upon positioning information provided by a positioning sensor.

16. The method according to claim 14 wherein receiving configuration information defining an altered mobility measurement configuration comprises receiving information directing the user terminal to employ a radio resource control (RRC) connection reconfiguration procedure.

17. The method according to claim 16 wherein receiving information directing the user terminal to employ the RRC connection reconfiguration procedure comprises receiving information directing the user terminal to employ the RRC connection reconfiguration procedure without provision of a mobility measurement.

18. The method according to claim 16 wherein receiving information directing the user terminal to employ the RRC connection reconfiguration procedure comprises receiving information directing the user terminal to provide mobility measurements according to requirements that are relaxed relative to requirements imposed upon the user terminal in a mobile state.

19. The method according to claim 16 wherein receiving information directing the user terminal to employ the RRC connection reconfiguration procedure comprises receiving at least one parameter that defines an offset for discontinuous reception (DRX), a back-off parameter or a paging parameter.

20. An apparatus comprising at least one processor and at least one memory storing computer program code, wherein the at least one memory and stored computer program code are configured, with the at least one processor, to cause the apparatus to at least:
determine a stationary status of a user terminal;
cause provision of a message to a network entity via an uplink synchronization channel (UL-SCH) to indicate the stationary status of the user terminal, wherein the message comprises at least one stationary status bit disposed in a media access control (MAC) header of the UL-SCH; and
receive configuration information defining an altered mobility measurement configuration based on the stationary status.

21. The apparatus according to claim 20 wherein the at least one memory and stored computer program code are configured, with the at least one processor, to cause the apparatus to determine the stationary status by determining the stationary status based upon positioning information provided by a positioning sensor.

22. The apparatus according to claim 20 wherein the at least one memory and stored computer program code are configured, with the at least one processor, to cause the apparatus to receive configuration information defining an altered mobility measurement configuration by receiving information directing the user terminal to employ a radio resource control (RRC) connection reconfiguration procedure.

23. The apparatus according to claim 22 wherein the at least one memory and stored computer program code are configured, with the at least one processor, to cause the apparatus to receive information directing the user terminal to employ the RRC connection reconfiguration procedure by receiving information directing the user terminal to employ the RRC connection reconfiguration procedure without provision of a mobility measurement.

24. The apparatus according to claim 22 wherein the at least one memory and stored computer program code are configured, with the at least one processor, to cause the apparatus to receive information directing the user terminal to employ the RRC connection reconfiguration procedure by receiving information directing the user terminal to provide mobility measurements according to requirements that are relaxed relative to requirements imposed upon the user terminal in a mobile state.

25. The apparatus according to claim 22 wherein the at least one memory and stored computer program code are configured, with the at least one processor, to cause the apparatus to receive information directing the user terminal to employ the RRC connection reconfiguration procedure by receiving at least one parameter that defines an offset for discontinuous reception (DRX), a back-off parameter or a paging parameter.

26. A computer program product comprising at least one computer-readable storage medium having computer-executable program code portions stored therein, the computer-executable program code portions comprising program code instructions for:
  determining a stationary status of a user terminal;
  causing provision of a message to a network entity via an uplink synchronization channel (UL-SCH) to indicate the stationary status of the user terminal, wherein the message comprises at least one stationary status bit disposed in a media access control (MAC) header of the UL-SCH; and
  receiving configuration information defining an altered mobility measurement configuration based on the stationary status.

* * * * *